(No Model.) 5 Sheets—Sheet 4.

H. KANTOROVITZ.
DEVICE FOR MEASURING GARMENTS.

No. 543,253. Patented July 23, 1895.

WITNESSES:
John A. Rennie
Wm. P. Patton

INVENTOR
H. Kantorovitz
BY
Munn & Co.
ATTORNEYS.

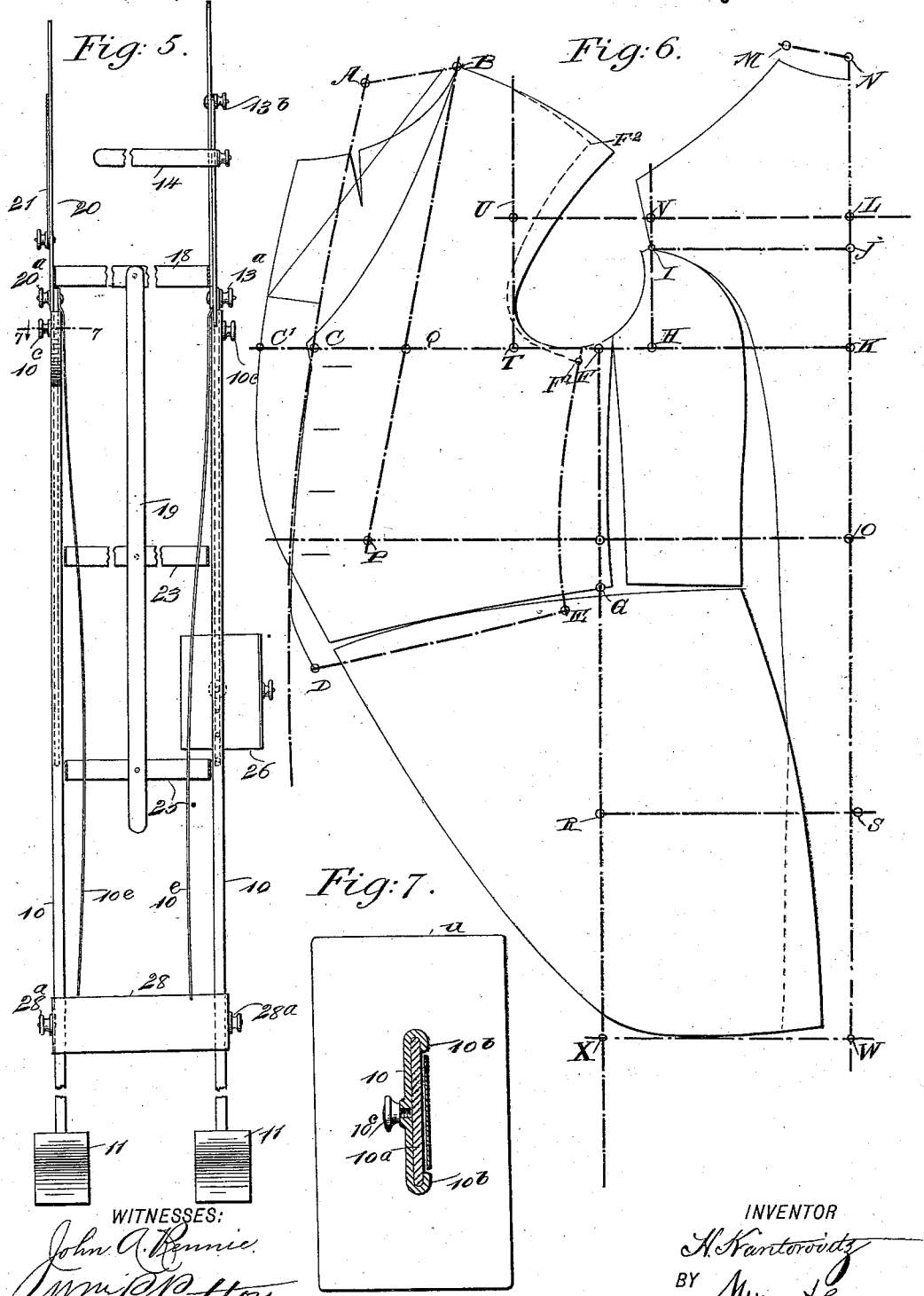

UNITED STATES PATENT OFFICE.

HARRIS KANTOROVITZ, OF WALLA WALLA, WASHINGTON, ASSIGNOR OF ONE-HALF TO GEORGE RETZER, OF SAME PLACE.

DEVICE FOR MEASURING GARMENTS.

SPECIFICATION forming part of Letters Patent No. 543,253, dated July 23, 1895.

Application filed July 21, 1894. Serial No. 518,171. (No model.)

*To all whom it may concern:*

Be it known that I, HARRIS KANTOROVITZ, of Walla Walla, in the county of Walla Walla and State of Washington, have invented a new and useful Improved Device for Measuring Garments, of which the following is a full, clear, and exact description.

My invention relates to improved means for the accurate measurement of a person, to enable the operator to correctly draft and cut garments, such as coats and vests, with an assurance that such articles of wear, when completed, will exactly fit the person measured with the novel instrument.

My invention consists in the peculiar construction and combination of parts, as is hereinafter specifically described, and indicated in the claims.

Reference is to be had to the accompanying drawings, forming a part of this specification, in which similar figures and letters of reference indicate corresponding parts in all the views shown.

Figure 1:
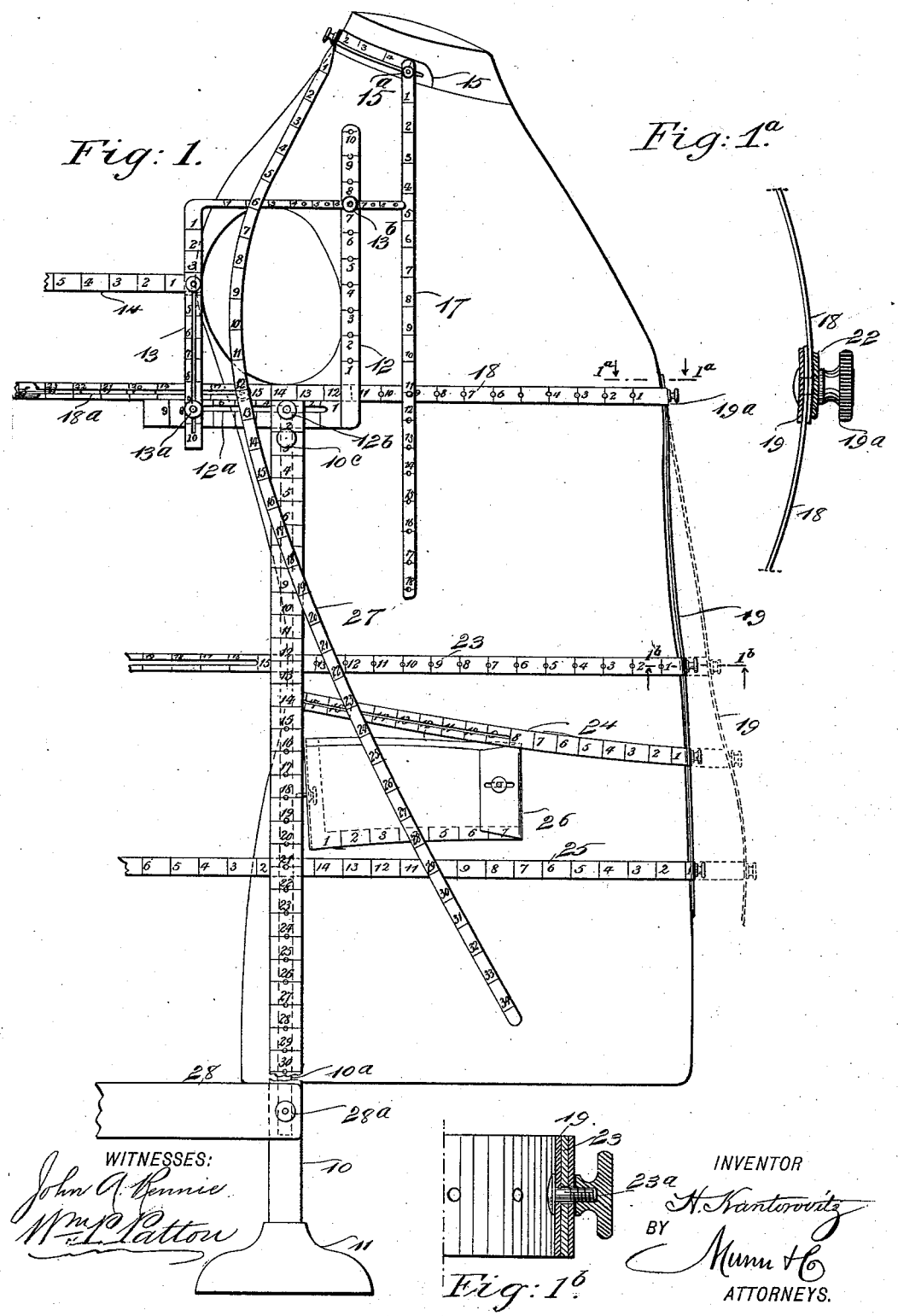
Figure 2:
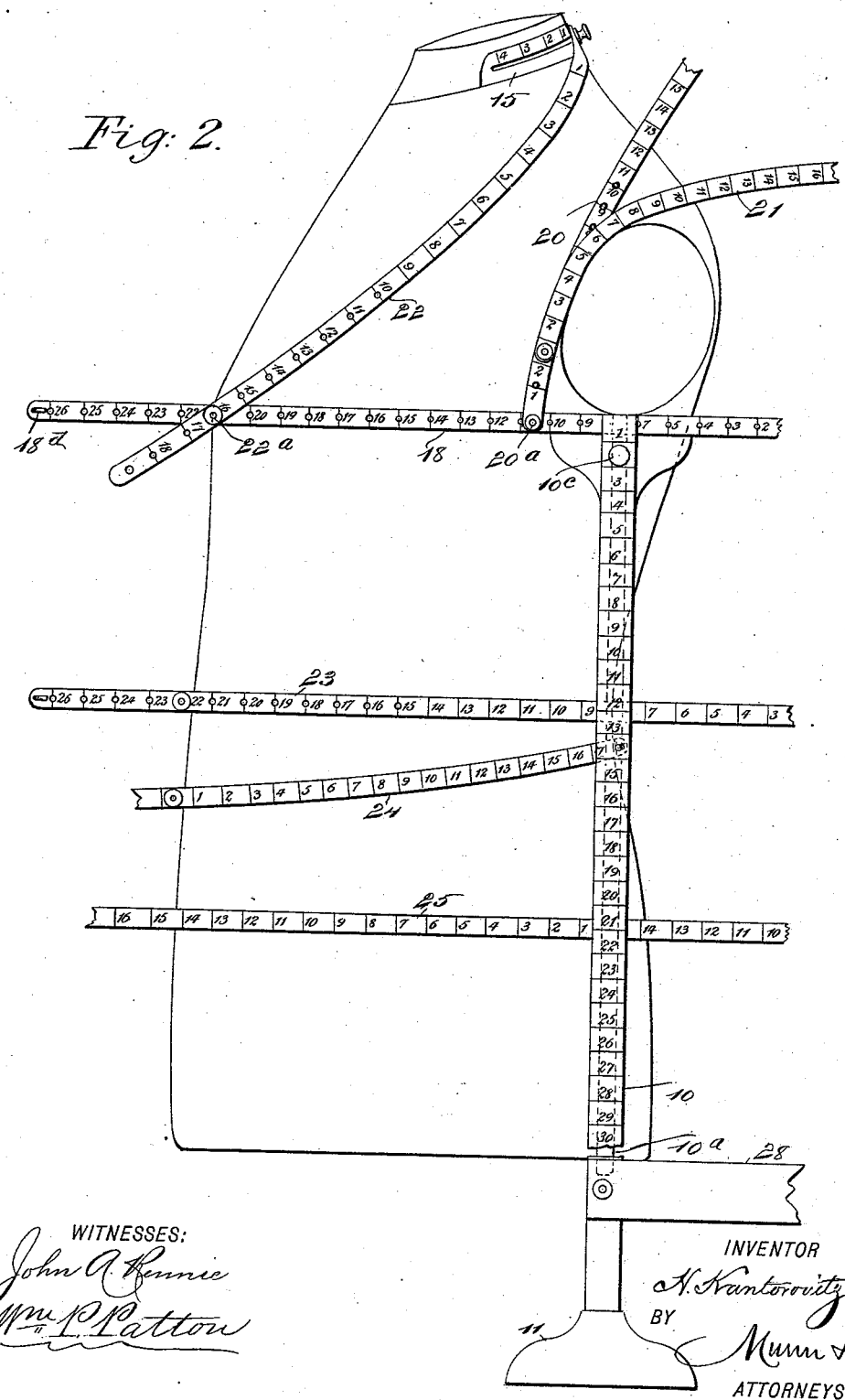
Figure 3:
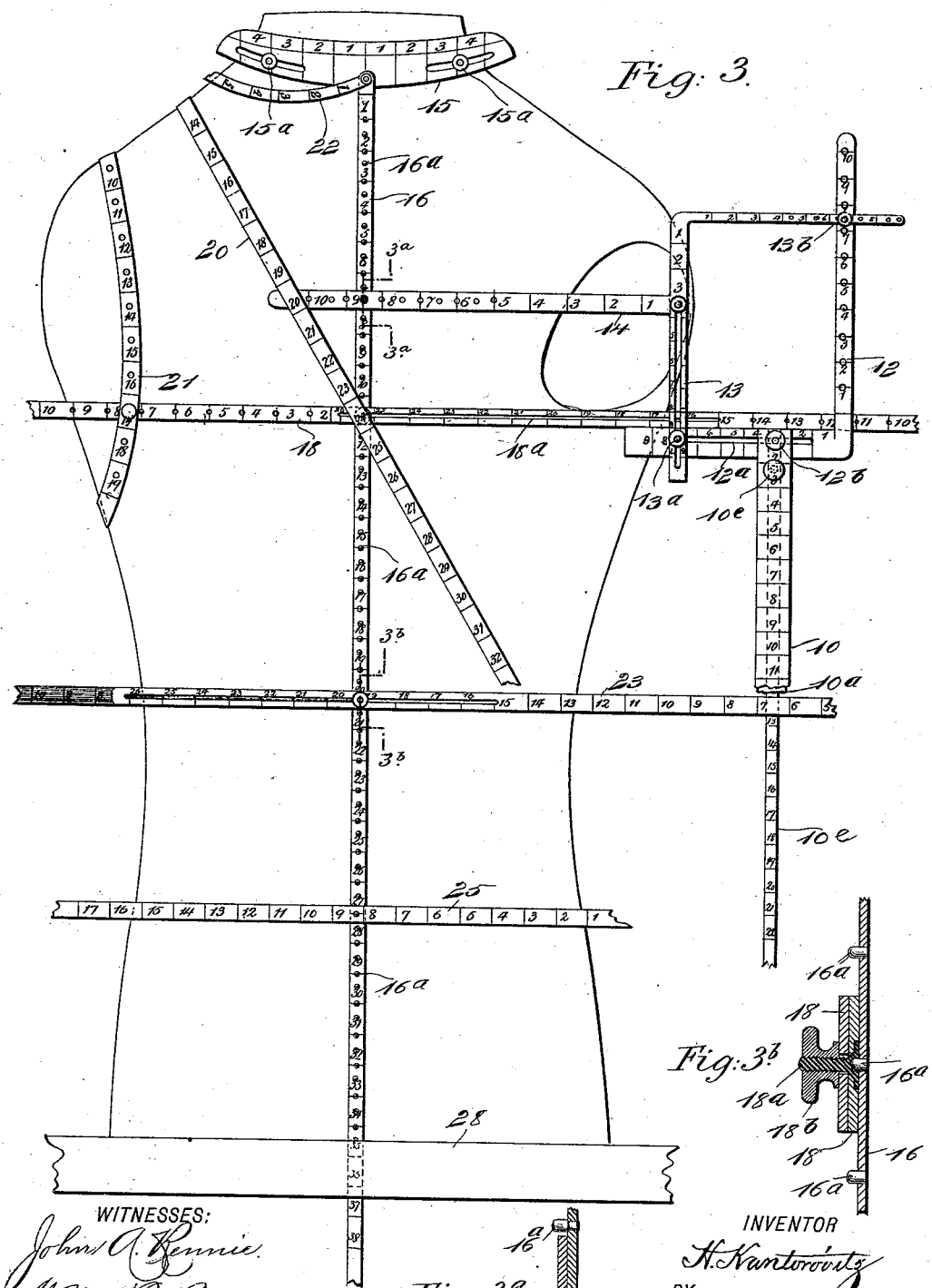
Figure 4:
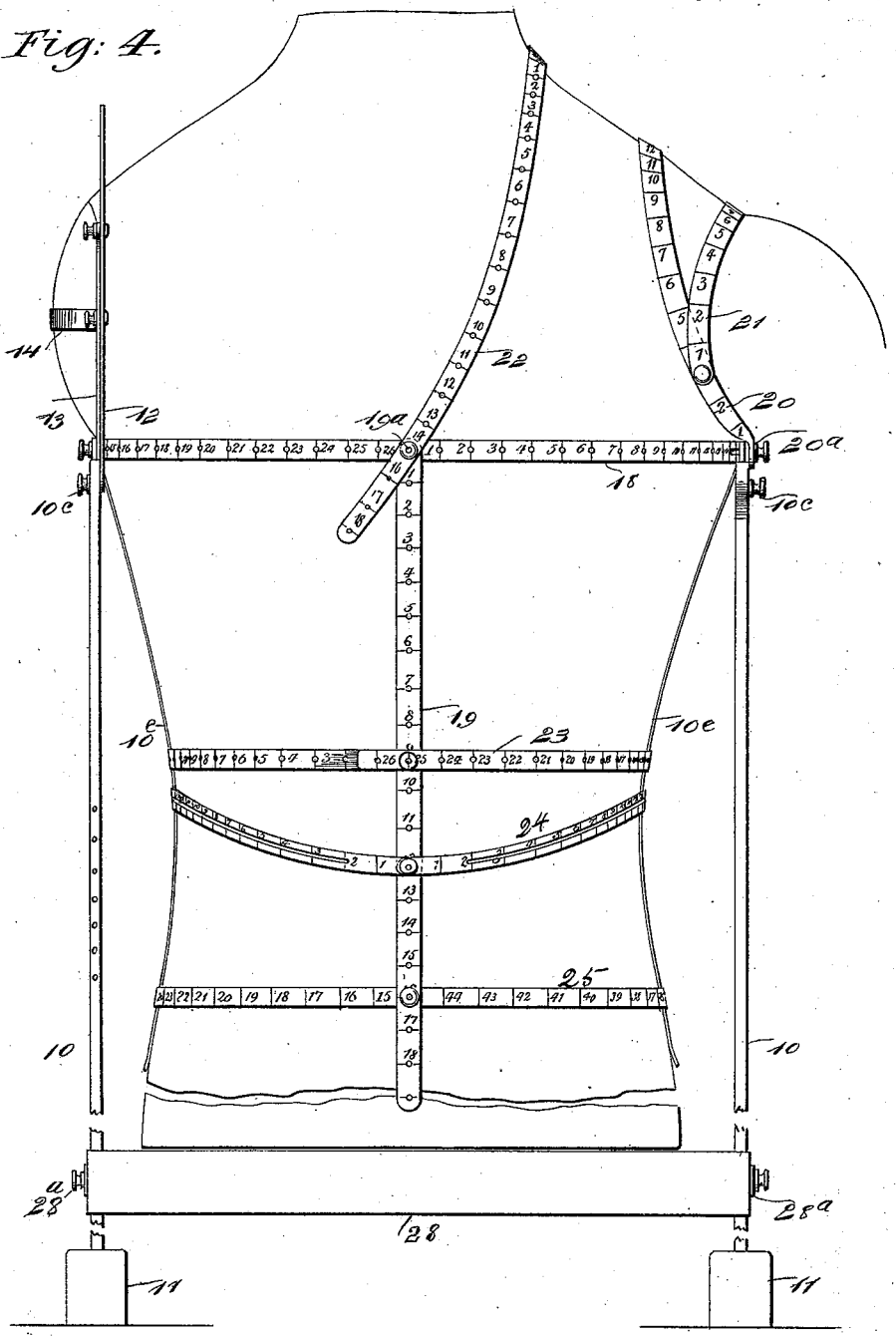

Figure 1 is a side view of the improved device with portions of the same extended and broken away, the instrument being shown applied to the outline of a sack-coat, representing the manner of using the improvement for measuring the person to obtain data from which to draft such a garment. Fig. $1^a$ is an enlarged partly-sectional plan view of portions of the improved measuring-instrument taken on the line $1^a$ $1^a$ in Fig. 1. Fig. $1^b$ is an enlarged sectional plan view of other parts of the device at the front and below the details shown in Fig. 1, taken on the line $1^b$ $1^b$ in Fig. 1. Fig. 2 is a side view of opposite portions of the measuring device from that shown in Fig. 1, applied to the outline of a sack-coat to indicate the manner of using the instrument, portions of the device being projected flatwise to show their construction and portions shown broken away at the front and rear sides of the coat. Fig. 3 is a rear view of main portions of the improvements applied to the back part of a sack-coat, one side of the measuring device being represented as outwardly projected flatwise to clearly show the form and relative position of said parts with regard to connected portions of the instrument. Fig. $3^a$ is an enlarged vertical sectional view of portions of the device at the rear of the same, on the line $3^a$ $3^a$ in Fig. 3. Fig. $3^b$ is an enlarged vertical sectional view of parts of the improved measuring device located below those shown in Fig. $3^a$, taken on the line $3^b$ $3^b$ in Fig. 3. Fig. 4 is a front view of the improvement applied to coat portions in outline, lower portions of the device and of the coat being represented as intermediately broken away. Fig. 5 is a partly-sectional front view of the improved measuring-instrument in an erect position, front portions being removed and other details intermediately broken away. Fig. 6 is a diagrammatic representation of one of the sides and a back piece of a cutaway frock-coat, with various indicating-lines on the same, showing proper points for obtaining dimensions of a person to draft such a garment; and Fig. 7 is an enlarged transverse sectional view of portions of the improvement on the line 7 7 of Fig. 5.

The improved measuring device briefly described consists of two upright spaced standards that in use are placed one at each side of a person who is to be measured, said standards, that are telescopic in construction, affording support to several other pliable measuring attachments that are adjustable on said standards and are conveniently arranged, so that all the different dimensions of a person needed to correctly delineate a garment which is to be subsequently drafted and cut may be successively, rapidly, and accurately taken by the application of the several graduated measuring appliances that are located on the standards, and with the latter comprise the improved composite measuring-instrument.

In the drawings, 10 represents the standards of the improved measuring-instrument. These consist of two similar and preferably rigid bars of metal or other suitable material, which are rectangular in cross-section and of such a length that they will be adapted with other parts to afford effective service, as will be further explained. These standards may, however, be of any desired shape in cross-section.

The standards 10 are affixed on the heavy base-blocks 11, that have a sufficient weight and area to enable them to sustain in position other attached parts.

There is a longitudinal groove of proper width and depth produced in one side of each standard for the reception of the similar slide-bars 10ª, that are designed to afford extensions for the parts they are embedded in, and preferably there are two flanges 10ᵇ formed on the side edges of each standard, which are lapped toward each other to loosely embrace the inserted slide-bar, as indicated in Fig. 7. Thus each standard and slide-bar has a telescopic connection that facilitates the lengthening or shortening of the standards as in use may be required, this adjustment of parts being completed by the manipulation of a set-screw 10ᶜ, that is inserted in a tapped perforation at the upper end of each standard, which screws have pressure on the slide-bars to retain them at any point of adjustment.

Two similar thin elastic strips 10ᵉ, Fig. 4, are provided, one for each slide-bar, to which these strips are attached by their upper ends at the tops of the slide-bars and on their inner surface, the strips 10ᵉ being graduated the same as the bars and standards 10 on sides of the strips which are nearest to the slide-bars, said elastic strips being allowed to hang from their points of suspension on the bars 10ª.

The standards 10 and slide-bars 10ª are graduated to afford means for accurately ascertaining their height as adjusted, and said graduations may be in standard English measure of feet and inches, with fractions of the latter, or be marked to indicate dimensions of the metric or French system of measurement.

On the top of one of the slide-bars 10ª that is part of the standard 10 on the right-hand side of the composite measuring device, when it is applied for use, considered from the rear or back of the person, a two-part sleeve-hole-measuring device is located, which consists of the right-angle bent section 12, that is graduated on both of its members, as shown in Figs. 1 and 3. The lower and horizontal member is slotted, as at 12ª, to permit an adjustment and lapped connection to be produced between said limb of the square and the upper end of the slide-bar, a screw-bolt and nut 12ᵇ affording means for clamping said parts together at a proper point. Thus the square may be moved to adjust its upright limb toward the front or back of the person being measured, in which case the inner vertical edge of said limb is made to have contact with the front of the arm, and the horizontal member of the same is adjusted to impinge its upper edge on the arm at its lower side and junction with the body.

The other half-section 13 of the armhole-measuring device is formed substantially like the section 12, and is adjustably clamped on the latter by a set-screw 13ª and nut on its body, said bolt being adapted to engage the slots of limbs on both sections, so that the said sections may be vertically and laterally moved and secured at any desired point to inclose a rectangular space of more or less area, as occasion may require, and, as shown, the limbs of the square section 13 are graduated in like manner as the graduations produced on the limbs of the square section 12.

To hold the upper horizontal limb of the section 13 on the vertical limb of the section 12, spaced tapped holes are formed in the latter, and like holes are produced in the horizontal limb mentioned, so that the set-screw 13ᵇ may be inserted through opposite holes in these limbs and clamp them together at different points, as may be needed in use of this part of the composite measuring-instrument.

From the upright limb of the square section 13 a pliable and suitably-graduated measure-strip 14 is projected at a correct distance from the lower end of said upright limb, this part 14 being made of a proper length to insure its projection past the vertical center line on the back of a person of maximum girth who may be measured with the improved instrument, and at correctly-spaced intervals a series of perforations are formed in the measure-strip 14, the use of which will be explained.

A thin plate 15 forms another part of the improved measuring device, and is curved flatwise and edgewise to adapt it to conform to the shape of the neck of individuals that are to be measured, it having a sufficient length to serve its purpose efficiently.

The neck-plate 15 is longitudinally slotted of a proper length at two points, equally distant from its ends, and from the longitudinal center is graduated toward the ends, beginning at zero and equally and oppositely increasing in numeration.

At the center of the neck-plate the upper terminal of the back-strip 16 is secured by a set-screw or other means, which strip in use hangs at the transverse center of the spine of the person who is being measured. (See Fig. 3.) The back-strip is evenly graduated from end to end and should have a sufficient length to adapt it to indicate the measure of length for the longest coats worn by men.

At correct intervals a series of short studs 16ª are projected from the surface of the back-strip 16, as is clearly represented in Figs. 3ª and 3ᵇ of the drawings, and, as shown in Fig. 3ª, the measure-strip 14 has one of its perforations engaged by an appropriate one of the series of studs 16ª when the measuring device is in use, which engagement will indicate one-half of the breadth across the shoulders of a person to whom the instrument is applied, and said measure, that extends from the center line of the back-strip 16 to the edge of the upright limb on the square piece 13 and at a right angle to the latter, will therefore show the extent between the sleeve-hole seam and the median line of the back of the coat, which measure is to be duplicated, as usual, for both parts of the back of a coat, if the latter is for a person having a normal shape, or, in other words, is not distorted by nature or disease.

The neck-plate 15 has either of its longitudinal slots engaged by an adjusting-screw 15ª, from which extends the collar-gage strip 17, this being a thin pliable piece of metal or other material having a series of graduations produced on its exposed surface, and in its lower portion a series of spaced perforations are formed for a detachable connection with the breast-measuring strip 18.

The breast-measure, as its name indicates, is designed to afford means for ascertaining the compass of a person at the point mentioned, and for convenience in service is composed of two pieces of an equal length and breadth. One of the parts or half-sections of the breast-measuring strip 18 is made to overlap the other piece of the same and has a longitudinal slot 18ª produced in it, which extends from near its rear end, of a proper length, toward the front. A sufficient length is given to the two equal parts of the breast-measuring strip 18, so that these together will be capable of encircling a very large person.

To facilitate measurement, the equal parts of the strip 18 are graduated throughout their length on the surfaces that are exposed in use, and said strips have an end of each lapped together at the rear and adjustably secured on the depending back-strip 16, the manner of conveniently effecting such a detachable connection of parts being shown in Fig. 3ᵇ of the drawings, consisting in a screw cut and headed shank 18ª and a clamping-nut 18ᵇ, the head of the shank being seated on the lower section of the two-part strip 18 and the body of the shank inserted through the slot in the upper section, so that the nut may be adjusted to bind both parts 18 together. The head of the shank 18ª is centrally perforated to receive any one of the studs 16ª and hold the lapped ends of the breast-measure strip detachably connected with the back-strip at any preferred point on the latter.

From the median line of the front of a person who is encircled with the breast-measuring strip 18 a hanger strip 19 is pendent, it being a thin pliable piece of metal or other suitable material that is secured by a clamping-screw 19ª on the lapped members of the two-part strip 18.

The hanger-strip 19 is adapted to conform to the shape of the individual on which it is placed, and has its outer surface evenly graduated from one end to the other, as clearly shown in Fig. 4, and perforations corresponding in spaced distance with said graduations are formed in this strip from end to end.

The half portion of the breast-measuring strip 18 that is not slotted is perforated at spaced intervals which represent even graduations on said strip. The slotted half-section of the two-part strip 18 has its unslotted front end portion perforated in series, the same as is effected in the other half-section of the strip, this construction facilitating the adjustable connection of the lapped front end portions of the breast-measuring strip with the hanger-strip by a screw and nut 19ª, as represented in Fig. 1ª.

On the extremity of the lower half-section of the two-part strip 18 that is at the front of a person on whom the instrument is adjusted a small hook 18ᵈ or an equivalent device, Fig. 2, is formed or secured, which is engaged with one of the spaced perforations in the other section of the strip 18 and holds the hooked end in place.

As before mentioned, an adjustable connection is formed between the collar-gage strip 17 and the parts 15 and 18, said gage-strips being detachably secured to the breast-measuring piece 18 by a stud or pin entering opposite holes in these parts at any point that the dimensions of the person who is being measured requires, the gage-strip being bent flatwise to cause it to conform to the body in front of the arm, and at a proper point has its upper end clamped to the neck-piece, as represented in Fig. 1, the screw that attaches said part 17 passing through one of the slots in the neck-piece, so that the graduations on the gage-strip 17 will indicate the correct distance to be used as a measure between the lower edge of the neck-piece that rests on the collar-bone or shoulder, and the natural breast-line, which is immediately below the armpits, where the strip 18 is located, as shown in Figs. 1 and 4.

The standard 10 that is on the left side of a person being measured, viewed from behind, is provided with lateral projections to widen it at the top, as shown in Fig. 3. The top of the standard proper is slotted in parallel with its front face to permit the breast-measuring strip 18 to slide in said slot and thus be retained in loose connection with the left-hand standard, a similar construction being provided for the top of the other standard for a like purpose.

On the outer section of the breast-measuring strip 18 at the left, considered from the rear, and close in front of the right arm of the party on whom the strip 18 is secured, a pliable shoulder-measuring tape 20 is removably attached by one end 20ª, said strip, which is graduated in inches and fractions, (the latter not shown,) being designed to be used for measuring from the point 20ª to the point of junction of the back-strip 16 with the breast-measure 18, as shown in Fig. 3, extending taut over the right shoulder of the individual being measured.

Another flexible measuring-strip 21 is furnished, which is graduated in a manner similar with the measuring-tape 20, and is adjustably secured to the latter by a screw, as shown in Fig. 2, or by other means, this strip being curved over and around the shoulder at the junction of the arm with it, and is extended in a like manner around at the rear, to be detachably secured to the breast-measuring strip 19, as indicated in Fig. 3, the strip 21 affording convenient and reliable means for ascertaining the dimensions of the armhole, which can be exactly determined if the end of the strip 20 is located near the standard 10.

On the neck-plate 15, at the median line behind where the back-piece 16 joins it, and by the same screw, a vest-front-measure strip 22 is secured by one end, this pliable strip being extended from said point of attachment over the shoulder and down in front diagonally, to be detachably connected to the hanger-plate and breast-measuring strip, as shown in Figs. 1$^a$, 2, and 4.

At a proper point below the graduated breast-measuring strip 18 the similarly constructed and marked two-part waist-measuring strip 23 is located, it being adjustably secured by two lapped ends on the back-strip 16, the manner of movably attaching the securing clamp-screw at said point on any one of the spaced studs that project from the back-strip being clearly shown in Fig. 3$^b$ of the drawings, this being the same as is provided to connect the breast-measure strip with the back strip, and which has been fully explained.

The overlapped front portions of the two-part strip 23 are secured together, when correctly adjusted on the person to be measured, by the clamping-screw and nut 23$^a$ (clearly shown in Fig. 1$^b$) that also serves to clamp the waist-measure on the hanger-strip 19 by engaging an appropriate perforation in the latter.

Below the natural waist-measure strip 23 a substantially-similar two-part lapping-strip 24 is adjustably attached to the back-strip 16 and front hanger-strip 19 by similar devices, comprising the screw attachments represented in Figs. 1$^b$ and 3$^b$ that have been described, this measuring appliance serving to indicate the correct distance from the natural waist-line to the fashionable waist-line on a frock-coat, or the lower edge of a vest that is to be drafted and cut, said measuring-strip, as well as the natural waist-measuring strip, affording means to ascertain the front line of a coat or vest, as the girth and protuberance of the stomach is indicated by these parts of the composite measuring-instrument.

There is a hip and seat measure strip 25, adjustably attached to the back-strip 16 and front depending hanger-strip 19 by set-screws, such as have been described and shown in Figs. 1$^b$ and 3$^b$, so that the two-part longitudinally-adjustable strip 25 may be vertically changed in position to suit the figure of the person being measured.

The encircling measure-strips 23, 24, and 25 that are located below the breast-measure strip 18 are passed around the pendent elastic strips 10$^e$, and when correctly drawn so as to have a proper contact with the person at the several points to be measured these strips will draw the pendent pieces 10$^e$ toward the sides of the individual being measured and curve the said pieces flatwise, so as to cause them to conform to the sides of the person they are made to impinge, as shown in Fig. 4, and it will be seen that the graduations on the pendent elastic strips 10$^e$ which are nearest the top edges of the encircling-strips 23, 24, and 25 will indicate the distances between said strips as adjusted on the party they encircle, and also show their respective distances from the breast-measure strip, or, in other words, the space intervening the armpits and either of the encircling measure-strips, which is essential in taking the measure for some garments.

In Fig. 1 a sleeve-length indicator is shown, consisting of an imitation cuff 26 that is securable by a set-screw on the front edge of the standard bearing the armhole-measuring squares 12 and 13 at different points of height, said cuff being placed on the individual when the measuring-instrument is used, and is adjusted in compass as well as in position on the standard; and to take the exact measure for length of the sleeves the graduated tape-measure 27 is provided, that is held in place by its attachment on the neck-plate 15, directly over the arm, so that the shoulder-measure from collar-line to the top of the sleeve-seam may be read along with the sleeve-length measure.

On the standards 10 below the hip and seat measuring strip 25 the elastic strip 28 is secured by its ends by screws 28$^a$ that are insertible in any of the spaced perforations made to receive them, and located at a proper distance from the bases 11 of said standards, this strip being provided to indicate the length of the coat, its upper edge locating the graduations on the standards that show a correct length for the person who is to be fitted with such a garment.

In using the composite measuring device that has been described, the individual to be measured is expected to stand erect, in a natural position, and the two standards 10 are placed one at each side, so that they will be plumb beneath the armpits of the person.

The adjustable two-part squaring device 12 13 is now made to embrace the arm it is nearest, at the junction of the same with the body, and by the graduations of the limbs of the duplicate squares will correctly give the dimensions at four points of the armhole, that can be readily drafted from these sizes, and at the same time the distance from the edge of the rear upright square limb to the center of the vertical back-strip 16 can be read on the horizontal limb 14.

After all the measuring appliances are accurately adjusted on the person the several sizes they indicate can be entered on a memorandum-slip or in a measure-register for future reference, and they can be referred to to prove a correct reading before a removal of the adjusted instrument, so that perfect accuracy in measurement may be had at every point that is to be measured.

The diagram shown in Fig. 6, which represents one side and one back piece of a fashionable cutaway-coat and also the outline of a stylish vest, indicates the points for transfer of the several dimensions as taken from the composite instrument to the cloth to be cut. In said Fig. 6 the distance between the points A and B, together with the space between M and N, indicates the extent from a median line front at the neck to a center line at the back, which is sufficient to draft the side and back piece at that point. From A to C the distance at the front from the top of the breast to the natural breast-line C K is shown. From A to C and thence to D shows the length of a fashionable vest from collar to lower edge at the front and on the shoulders. B to P represents the distance from the collar-line to the natural waist-line for a coat, and B to C shows the slope-line at the front for cutting away the upper front edge of a fancy vest. B to Q indicates the distance from the collar-line over the shoulders to the breast-line C K. U V, U T, V H, and T H show the lines indicated by the adjustable squaring device 13 of the composite instrument and give the armhole dimensions at four points, which will enable the cutter to correctly draft the armholes of a coat or vest. The distances from V to L and H to K are alike, and either shows the extent between the center of the back and the rear edge of the armhole. The distance from C to K represents the measure of one-half of the body at the breast-line, and from C to C′ the lap of the coat at the front is indicated, and F′ F² is the vest-armhole line. Q to P shows the measure between the breast-line and natural waist-line. F to E is the line of the vest at the rear edge of the front or below the arm to the lower edge of the vest. D to E shows the width of one side of the vest-front at its lower edge. N to S is the distance from the lower edge of the collar to the hip or seat line, and from N to W the entire length of the coat, exclusive of its collar, is given. X W shows the width from under the center of the armpit to the median line of the back and shows the lower point for the slope on the front edge of the skirt of the coat.

It will be evident that to one skilled in the art the improvements herein represented and described will afford an easy system and a reliable device for the accurate measurement of a person to be fitted with a coat or vest of any style, and that by the use of the improvements the different sizes taken can be verified without remeasuring, which is a great convenience and insures a correct fit if the garment is drafted and cut from the measures thus taken.

Having thus described my invention, I claim as new and desire to secure by Letters Patent—

1. In a garment measuring device, the combination with standards adapted to project beneath the arm pits of the person to be measured, of a sleeve hole measuring device carried by one of the standards, a strip projecting horizontally from the sleeve hole measuring device, a breast strip supported by the standards, a neck plate, a back strip secured to the neck plate, breast strip and to the strip carried by the sleeve hole device, a shoulder tape secured to the breast strip at the front and rear, the attachment at the rear being at the point where the back strip unites with the breast strip, and a shoulder strip secured to the shoulder tape at the front and to the breast strip at the rear, substantially as described.

2. In a garment measuring device, the combination with standards adapted to project beneath the arm pits of the person to be measured, of a sleeve hole measuring device, adjustably secured to one of the standards, and consisting of a right angle section having its horizontal member slotted and its vertical member apertured, and a similarly shaped section having its vertical member slotted and adjustably secured to the horizontal member of the first named section and its horizontal member adjustably secured to the vertical member of the said first section, substantially as described.

3. In a garment measuring device, the combination with standards, of graduated flexible strips having one end secured to the upper ends of the standard, encircling measuring strips engaging the flexible strips, and means for supporting said encircling strips, substantially as and for the purpose set forth.

HARRIS KANTOROVITZ.

Witnesses:
THOS. D. S. HART,
GEORGE RETZER.